(12) United States Patent
Kinjo et al.

(10) Patent No.: US 11,408,485 B2
(45) Date of Patent: Aug. 9, 2022

(54) ELECTRIC ACTUATOR

(71) Applicant: Nidec Tosok Corporation, Zama (JP)

(72) Inventors: Shuichi Kinjo, Zama (JP); Yutaka Uematsu, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 304 days.

(21) Appl. No.: 16/629,212

(22) PCT Filed: Aug. 22, 2018

(86) PCT No.: PCT/JP2018/030951
§ 371 (c)(1),
(2) Date: Jan. 7, 2020

(87) PCT Pub. No.: WO2019/065007
PCT Pub. Date: Apr. 4, 2019

(65) Prior Publication Data
US 2020/0200234 A1    Jun. 25, 2020

(30) Foreign Application Priority Data

Sep. 28, 2017 (JP) .............................. JP2017-189031

(51) Int. Cl.
*F16H 1/32* (2006.01)
*H02K 7/116* (2006.01)
(Continued)

(52) U.S. Cl.
CPC .............. *F16H 1/32* (2013.01); *H02K 7/116* (2013.01); *F16H 57/021* (2013.01);
(Continued)

(58) Field of Classification Search
CPC .... F16H 1/32; F16H 57/021; F16H 2001/323; F16H 2001/325; F16H 2057/02034;
(Continued)

(56) References Cited

U.S. PATENT DOCUMENTS 7,281,445 B2    10/2007   Sasaki
9,236,780 B2    1/2016    Oishi
(Continued)

FOREIGN PATENT DOCUMENTS

JP    2006-097883 A    4/2006
JP    2013-153624 A    8/2013
(Continued)

OTHER PUBLICATIONS

Official Communication issued in International Patent Application No. PCT/JP2018/030951, dated Oct. 30, 2018.

*Primary Examiner* — Ninh Luong
(74) *Attorney, Agent, or Firm* — Keating & Bennett (57) ABSTRACT

An electric actuator includes a motor with a motor shaft extending along a central axis, a speed reducer connected to the motor shaft, an output portion including an output shaft portion, a rotation detector to detect rotation of the output portion, a case, a first bearing to connect the motor shaft to the output portion to be rotatable with respect to each other, and a second bearing to rotatably support the output portion with respect to the case. A support tubular portion into which the second bearing is fitted is provided at a portion of an inner surface of the case on one side in the axial direction for the speed reducer. The first bearing, the output portion, the second bearing and the support tubular portion overlap each other when seen in a radial direction. At least a portion of the rotation detector faces an outward side of the support tubular portion in the radial direction.

11 Claims, 3 Drawing Sheets

(51) Int. Cl.
  *H02K 11/215* (2016.01)
  *F16H 57/021* (2012.01)
  *F16H 57/02* (2012.01)
  *H02K 5/173* (2006.01)

(52) U.S. Cl.
  CPC .. *F16H 2001/323* (2013.01); *F16H 2001/325* (2013.01); *F16H 2057/02034* (2013.01); *H02K 5/1732* (2013.01); *H02K 11/215* (2016.01)

(58) Field of Classification Search
  CPC .... H02K 7/116; H02K 5/1732; H02K 11/215; F16C 17/10; F16C 19/06
  See application file for complete search history.

(56) References Cited

U.S. PATENT DOCUMENTS

| | | | |
|---|---|---|---|
| 10,978,939 B2* | 4/2021 | Shirai | H02K 7/06 |
| 2013/0313949 A1 | 11/2013 | Fujii | |
| 2018/0287455 A1* | 10/2018 | Uematsu | H02K 5/225 |
| 2019/0001826 A1 | 1/2019 | Suzuki | |
| 2019/0173360 A1* | 6/2019 | Shirai | H02K 5/225 |
| 2019/0199177 A1* | 6/2019 | Uematsu | H02K 7/116 |
| 2019/0207475 A1* | 7/2019 | Uematsu | F16H 19/001 |
| 2020/0251958 A1* | 8/2020 | Kinjo | H02K 7/088 |

FOREIGN PATENT DOCUMENTS

| | | | | |
|---|---|---|---|---|
| JP | 2013-247798 A | 12/2013 | | |
| WO | WO 2013038572 A1 * | 3/2013 | | H02K 5/10 |
| WO | 2017/154837 A1 | 9/2017 | | |

* cited by examiner

ELECTRIC ACTUATOR

CROSS REFERENCE TO RELATED APPLICATIONS

This is a U.S. national stage of PCT Application No. PCT/JP2018/030951, filed on Aug. 22, 2018, and priority under 35 U.S.C. § 119(a) and 35 U.S.C. § 365(b) is claimed from Japanese Application No. 2017-189031, filed Sep. 28, 2017; the entire contents of each application are hereby incorporated herein by reference.

1. FIELD OF THE INVENTION

The present disclosure relates to an electric actuator.

2. BACKGROUND

A rotary actuator of Japanese Unexamined Patent Publication No. 2013-247798 includes a motor which rotationally drives an input shaft, a reducer which decelerates the rotation of the input shaft and transmits the decelerated rotation to an output shaft, and a case which accommodates the motor and the reducer. Japanese Unexamined Patent Publication No. 2013-247798.

In Japanese Unexamined Patent Publication No. 2013-247798, when a rotation detection device which detects the rotation of the output shaft is provided in the case, the following changes in a structure occur. One end portion of the input shaft extends to one side in an axial direction. A front bearing which supports one end portion of the input shaft from an outward side in the radial direction, an output shaft which is fitted to an outward side of the front bearing in the radial direction, and a metal bearing which supports the output shaft from an outward side in the radial direction are moved to one side in the axial direction. Therefore, an accommodation space for the rotation detection device is provided in the case. However, in this case the external shape of the rotary actuator is enlarged in the axial direction.

SUMMARY

In view of the above-described circumstances, example embodiments of the present disclosure provide electric actuators in each of which an external shape is able to be kept small in an axial direction.

An electric actuator according to an example embodiment of the present disclosure includes a motor including a motor shaft extending along a central axis, a speed reducer disposed radially outward of a portion of the motor shaft on one side in an axial direction and connected to the motor shaft, an output portion including an output shaft portion to which rotation of the motor shaft is transmitted via the speed reducer, a rotation detector to detect rotation of the output portion, a case to accommodate the motor, the speed reducer, the output portion, and the rotation detector, a first bearing to connect the motor shaft to the output portion so as to be rotatable with respect to each other, and a second bearing to rotatably support the output portion with respect to the case, wherein the output shaft portion extends in the axial direction and is disposed on the one side in the axial direction for the motor shaft, a support tubular portion into which the second bearing is fitted is provided on a portion of an inner surface of the case located on the one side in the axial direction for the speed reducer, the first bearing, the output portion, the second bearing and the support tubular portion overlap each other when seen in a radial direction, and at least a portion of the rotation detector faces an outward side of the support tubular portion in the radial direction.

According to example embodiments of the present disclosure, electric actuators each have a small external shape in the axial direction.

The above and other elements, features, steps, characteristics and advantages of the present disclosure will become more apparent from the following detailed description of the example embodiments with reference to the attached drawings.

DETAILED DESCRIPTION

Figure 1:
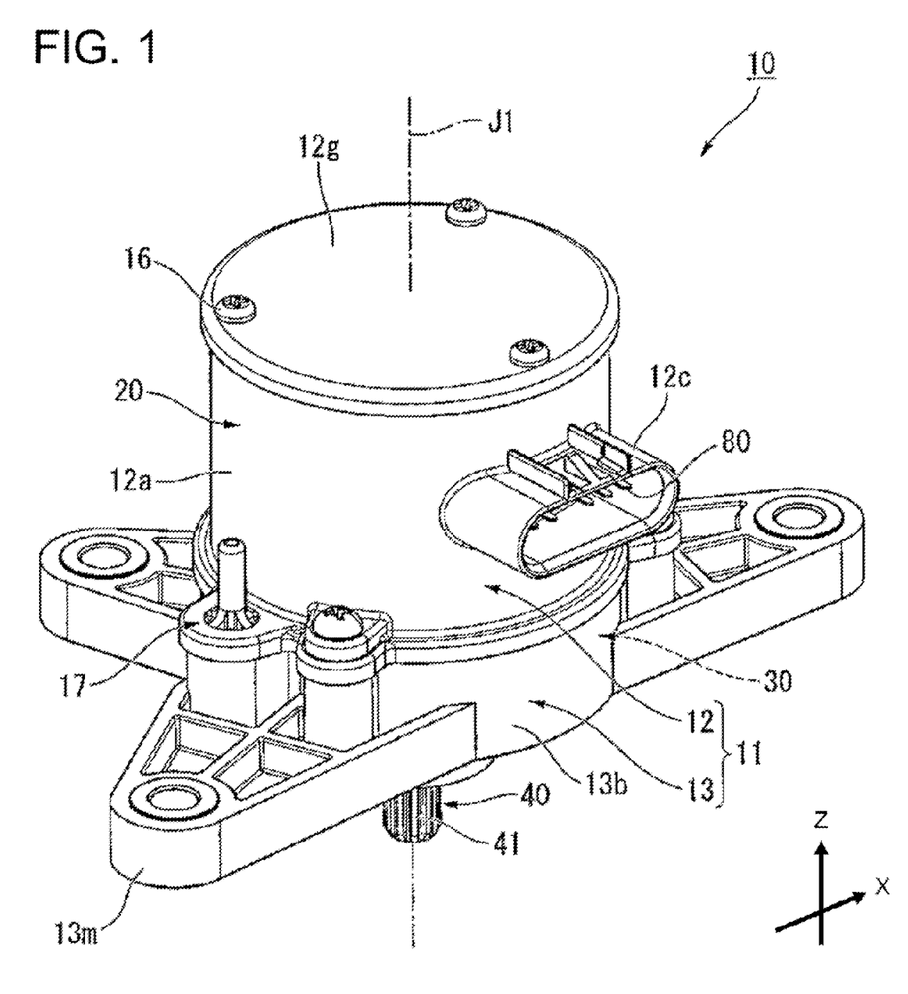
FIG. 1 is a perspective view showing an electric actuator of an example embodiment of the present disclosure.
Figure 2:
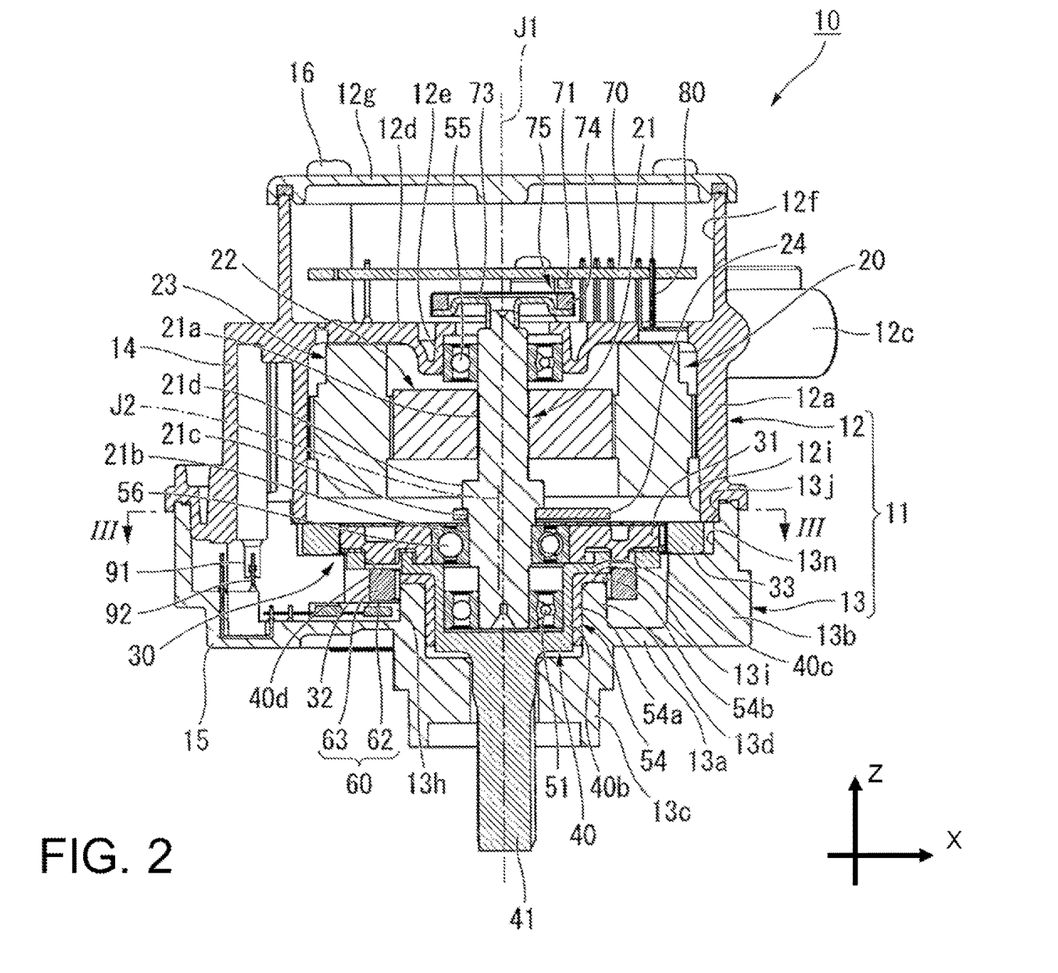
FIG. 2 is a longitudinal cross-sectional view of an electric actuator of an example embodiment of the present disclosure.

As shown in FIGS. 1 and 2, an electric actuator 10 of an example embodiment includes a case 11, a motor 20, a speed reduction mechanism 30, an output portion 40, a rotation detection device 60, a first wiring member 91, a second wiring member 92, a first bearing 51, a second bearing 54, a third bearing 55, and a fourth bearing 56. The motor 20 includes a rotor 22, a stator 23, a control board 70, a bus bar 80, and a rotation detection portion 75. The rotor 22 has a motor shaft 21 which extends along a first central axis (a central axis) J1. That is, the motor 20 has the motor shaft 21. The speed reduction mechanism 30 is connected to the motor shaft 21. The output portion 40 has an output shaft portion 41 to which rotation of the motor shaft 21 is transmitted via the speed reduction mechanism 30. The output shaft portion 41 extends in an axial direction of the first central axis J1. The output shaft portion 41 is disposed at an axial position different from that at which the motor shaft 21 is disposed. In an example of the example embodiment, an axial direction (i.e., in any direction parallel to the z-axis direction) of the first central axis J1 is a vertical direction.

In the example embodiment, a direction parallel to the first central axis J1 is simply referred to as an "axial direction." In the axial direction, a direction from the motor shaft 21 toward the output shaft portion 41 is referred to as one side in the axial direction, and a direction from the output shaft portion 41 toward the motor shaft 21 is referred to as the other side in the axial direction. The one side in the axial direction is a direction from the motor 20 toward the speed reduction mechanism 30 and the output portion 40 along the first central axis J1. The other side in the axial direction is a direction from the output portion 40 and the speed reduction mechanism 30 toward the motor 20 along the first central axis J1. In the example of the example embodiment, the one side in the axial direction is the lower side which is the lower side in FIGS. 1 and 2. The other side in the axial direction is the upper side which is the upper side in FIGS. 1 and 2. The upper side and the lower side are simply names for explaining a relative positional relationship between respective portions, and an actual positional relationship or the like may be a positional relationship other than a positional relationship indicated by these names.

A radial direction around the first central axis J1 is simply referred to as a "radial direction." In the radial direction (e.g., in any plane parallel to the x-axis direction and inward toward or outward away from the z-axis), a direction which of approaching the first central axis J1 is referred to as an inward in the radial direction, and a direction away from the first central axis J1 is referred to as an outward in the radial direction. A circumferential direction around the first central axis J1 is simply referred to as a "circumferential direction."

The case 11 accommodates the motor 20, the speed reduction mechanism 30, the output portion 40, and the rotation detection device 60. The case 11 includes a motor case 12 and a speed reduction mechanism case 13. The motor case 12 and the speed reduction mechanism case 13 are made of a resin. That is, the case 11 is made of a resin. As shown in FIG. 1, the case 11 has a breather portion 17. The breather portion 17 has a vent hole which connects the inside and the outside of the case 11 to each other. As shown in FIG. 2, the motor case 12 has a first opening portion 12$i$ which opens to the one side in the axial direction. The speed reduction mechanism case 13 has a second opening portion 13$j$ which opens to the other side in the axial direction. The case 11 has a configuration in which the motor case 12 and the speed reduction mechanism case 13 are fixed in a state in which the opening portions face each other in the axial direction. That is, the motor case 12 and the speed reduction mechanism case 13 are fixed to each other in a state in which the first opening portion 12$i$ and the second opening portion 13$j$ face each other in the axial direction. In a state in which the motor case 12 and the speed reduction mechanism case 13 are fixed to each other, the inside of the first opening portion 12$i$ and the inside of the second opening portion 13$j$ are able to communicate with each other.

The motor 20, the first wiring member 91, and the third bearing 55 are accommodated in the motor case 12. The motor case includes a peripheral wall portion 12$a$, a lid body 12$g$, a partition wall portion 12$d$, a bearing holding portion 12$e$, a connector portion 12$c$, and a first wiring holding portion 14.

The peripheral wall portion 12$a$ has a tubular shape which extends in the axial direction around the first central axis J1. The peripheral wall portion 12$a$ has a cylindrical shape. The peripheral wall portion 12$a$ opens at an end portion on the one side in the axial direction. The peripheral wall portion 12$a$ opens at an end portion on the other side in the axial direction. One axial surface and the other axial surface of the peripheral wall portion 12$a$ are open. That is, the peripheral wall portion 12$a$ opens to both sides in the axial direction. The peripheral wall portion 12$a$ covers the surroundings of the first central axis J1 along the first central axis J1.

The stator 23 is accommodated in the peripheral wall portion 12$a$. The peripheral wall portion 12$a$ surrounds the outward side of the stator 23 in the radial direction. Inside of the peripheral wall portion 12$a$ is partitioned into a portion on the one side in the axial direction and a portion on the other side in the axial direction by the partition wall portion 12$d$ which will be described later. In the inside of the peripheral wall portion 12$a$, a portion on the one side in the axial direction with respect to the partition wall portion 12$d$ is a stator accommodation portion. In the inside of the peripheral wall portion 12$a$, a portion on the other side in the axial direction with respect to the partition wall portion 12$d$ is a control board accommodation portion 12$f$. In the example of the example embodiment, an inner diameter of the control board accommodation portion 12$f$ is larger than that of the stator accommodation portion.

As shown in FIGS. 1 and 2, the lid body 12$g$ has a plate shape. The lid body 12$g$ closes the opening portion of the peripheral wall portion 12$a$ which opens to the other side in the axial direction. The lid body 12$g$ closes the opening of the control board accommodation portion 12$f$ on the other side in the axial direction. The lid body 12$g$ is detachably mounted on the peripheral wall portion 12$a$ by using screws 16.

As shown in FIG. 2, the partition wall portion 12$d$ has an annular plate shape which extends inward from an inner peripheral surface of the peripheral wall portion 12$a$ in the radial direction. The partition wall portion 12$d$ covers the stator 23 from the other side in the axial direction. The partition wall portion 12$d$ is located between the rotor 22 and the control board 70, and is located between the stator 23 and the control board 70. The partition wall portion 12$d$ is disposed between a set of the rotor 22 and the stator 23, and the control board 70, the rotor 22 and the stator 23 are disposed along in the axial direction. A through hole which passes through the partition wall portion 12$d$ in the axial direction is provided in the partition wall portion 12$d$. For example, a coil wire or the like passes through the through hole. The coil wire extends from a coil of the stator 23 which will be described later, passes through the through hole and is electrically connected to the control board 70.

The bearing holding portion 12$e$ has a tubular shape. The bearing holding portion 12$e$ extends in the axial direction around the first central axis J1. The bearing holding portion 12$e$ is provided at a radially inner edge portion of the partition wall portion 12$d$. The third bearing 55 is fixed to an inner peripheral surface of the bearing holding portion 12$e$. The bearing holding portion 12$e$ holds the third bearing 55.

As shown in FIG. 1, the connector portion 12$c$ protrudes outward from the outer peripheral surface of the peripheral wall portion 12$a$ in the radial direction. The connector portion 12$c$ has a tubular shape which extends in the radial direction. The connector portion 12$c$ opens outward in the radial direction. In the example of the example embodiment, the connector portion 12$c$ has an oval cylindrical shape. A shape of the opening portion of the connector portion 12$c$ is an oval shape of which a length in the circumferential direction is longer than that in the axial direction. As shown in FIG. 2, the connector portion 12$c$ is disposed at a position which overlaps the partition wall portion 12$d$ in the radial direction. The connector portion 12$c$ holds the bus bar 80 which will be described later. The connector portion 12$c$ is a portion in which connection to electrical wiring outside the case 11 is performed. An external power source (not shown) is connected to the connector portion 12$c$.

Figure 3:
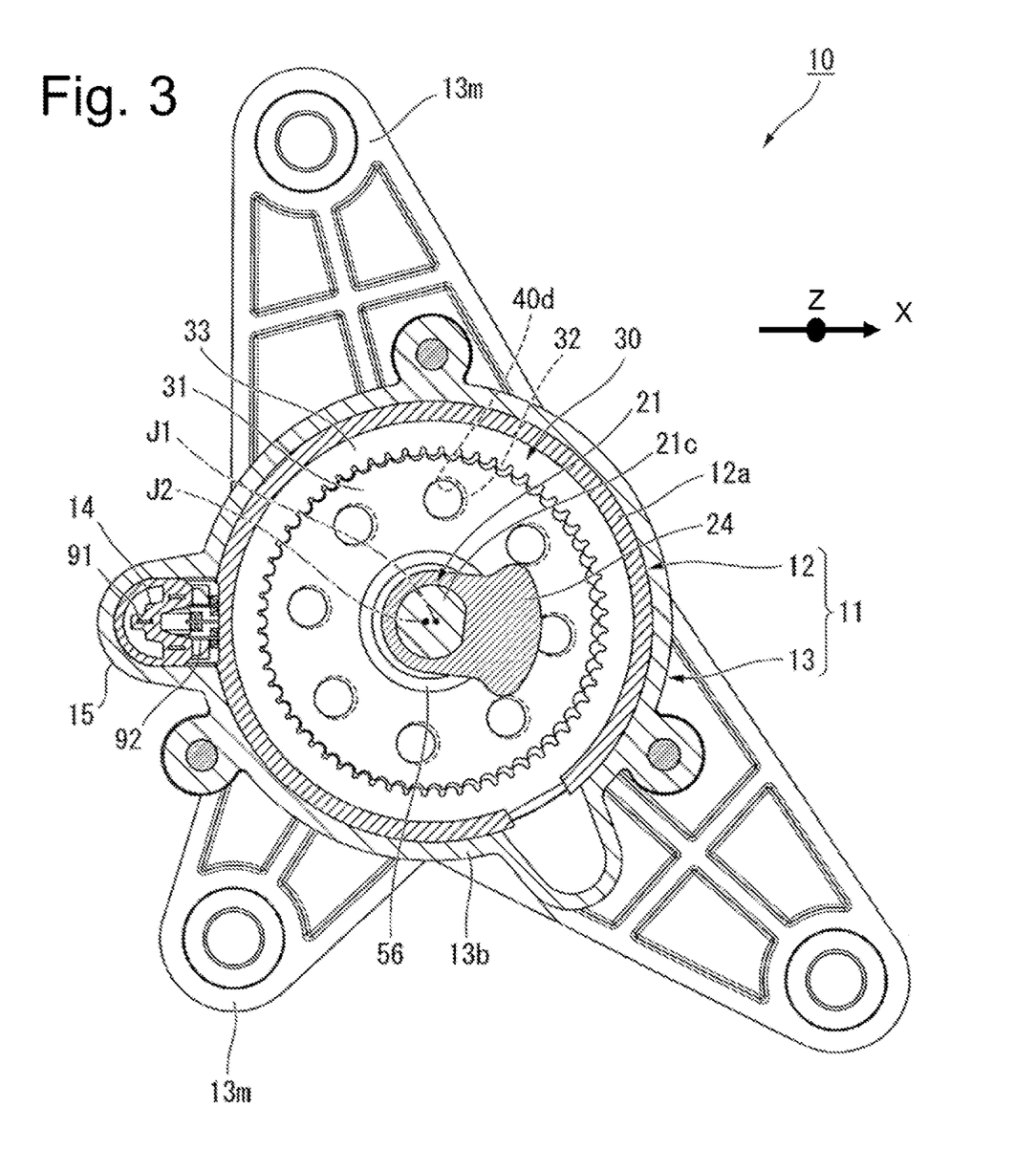
FIG. 3 is a cross-sectional view taken along line III-III of FIG. 2 and is a view when a speed reduction mechanism is directed to one side in an axial direction.

As shown in FIGS. 2 and 3, the first wiring holding portion 14 protrudes outward from the peripheral wall portion 12$a$ in the radial direction. As shown in FIG. 2, the first wiring holding portion 14 extends in the axial direction. The first wiring holding portion 14 opens to the one side in the axial direction. An axial position of an end portion of the first wiring holding portion 14 on the other side in the axial direction is the same as that of the partition wall portion 12$d$. A circumferential position of the first wiring holding portion 14 is different from that of the connector portion 12$c$.

The speed reduction mechanism case 13 accommodates the speed reduction mechanism 30, the output portion 40, the rotation detection device 60, the second wiring member 92, the first bearing 51, the second bearing 54, and the fourth bearing 56. As shown in FIGS. 1 and 2, the speed reduction mechanism case 13 includes a bottom wall portion 13$a$, a support tubular portion 13$d$, a mounting wall portion 13$h$, a protruding tubular portion 13c, a cover tubular portion 13b, a second wiring holding portion 15, and leg portions 13m.

As shown in FIG. 2, the bottom wall portion 13a has an annular plate shape centered on the first central axis J1. The bottom wall portion 13a covers the speed reduction mechanism 30 from the one side in the axial direction. A surface of the bottom wall portion 13a which faces the other side in the axial direction confronts the speed reduction mechanism 30 in the axial direction. The bottom wall portion 13a is a portion of an inner surface of the case 11 which is located on the one side in the axial direction in the speed reduction mechanism 30. The support tubular portion 13d is provided on the bottom wall portion 13a. The support tubular portion 13d has a tubular shape which protrudes from a surface of the bottom wall portion 13a which faces the other side in the axial direction toward the other side in the axial direction. The support tubular portion 13d has a cylindrical shape. The support tubular portion 13d extends from a radially inner edge portion of the bottom wall portion 13a to the other side in the axial direction. The support tubular portion 13d opens to the other side in the axial direction. An end surface 13i of the support tubular portion 13d which faces the other side in the axial direction has a planar shape which extends perpendicularly to the first central axis J1. The end surface 13i is an annular plane. An axial position of the end surface 13i is disposed on the one side in the axial direction with respect to an axial position of an end portion of the cover tubular portion 13b on the other side in the axial direction which will be described later.

The mounting wall portion 13h protrudes from a surface of the bottom wall portion 13a which faces the other side in the axial direction to the other side in the axial direction. The mounting wall portion 13h extends outward from an outer peripheral surface of the support tubular portion 13d in the radial direction. The mounting wall portion 13h extends from the support tubular portion 13d toward the second wiring holding portion 15 which will be described later. A radially inner edge portion of the mounting wall portion 13h is connected to the outer peripheral surface of the support tubular portion 13d. A radially outer edge portion of the mounting wall portion 13h is disposed in the second wiring holding portion 15. A radial position of the radially outer edge portion of the mounting wall portion 13h is disposed on the outward side in the radial direction with respect to a radial position of an inner peripheral surface of the cover tubular portion 13b which will be described later. A surface of the mounting wall portion 13h which faces the other side in the axial direction is located on the one side in the axial direction with respect to the end surface 13i of the support tubular portion 13d. Although not shown, a plurality of mounting wall portions 13h are provided at intervals in the circumferential direction on the surface of the bottom wall portion 13a which faces the other side in the axial direction. In the example of the example embodiment, two mounting wall portions 13h form a set, and the set of mounting wall portions 13h extend parallel to each other with a certain interval therebetween. The mounting wall portions 13h are, for example, two ribs which extend outward in the radial direction from the support tubular portion 13d. The mounting wall portions 13h fix a first rotation sensor 62 which will be described later while sandwiching the first rotation sensor 62 in the circumferential direction.

The protruding tubular portion 13c has a tubular shape which protrudes from the radially inner edge portion of the bottom wall portion 13a to the one side in the axial direction. The output shaft portion 41 is disposed in the protruding tubular portion 13c. The cover tubular portion 13b is a tubular shape which protrudes from the radially outer edge portion of the bottom wall portion 13a to the other side in the axial direction. The cover tubular portion 13b has a cylindrical shape. The cover tubular portion 13b opens to the other side in the axial direction. The cover tubular portion 13b covers the periphery of the first central axis J1 along the first central axis J1. An end portion of the cover tubular portion 13b on the other side in the axial direction is in contact with and fixed to an end portion of the peripheral wall portion 12a on the one side in the axial direction.

As shown in FIGS. 2 and 3, the second wiring holding portion 15 protrudes outward from the cover tubular portion 13b in the radial direction. As shown in FIG. 2, the second wiring holding portion 15 has a box shape which opens to the other side in the axial direction. The inside of the second wiring holding portion 15 is allowed to communicate with the inside of the cover tubular portion 13b. An axial position of the end portion of the second wiring holding portion 15 on the one side in the axial direction is the same as that of the bottom wall portion 13a. The second wiring holding portion 15 confronts the first wiring holding portion 14 in the axial direction. The inside of the second wiring holding portion 15 is allowed to communicate with the inside of the first wiring holding portion 14.

As shown in FIGS. 1 and 3, the leg portions 13m protrude outward from the cover tubular portion 13b in the radial direction. A plurality of leg portions 13m are provided on an outer peripheral surface of the cover tubular portion 13b at intervals in the circumferential direction. In the example of the example embodiment, three leg portions 13m are disposed at irregular intervals in the circumferential direction. Further, protruding lengths of the three leg portions 13m from the cover tubular portion 13b are different from each other. The electric actuator 10 can be mounted in an object such as a vehicle by using the leg portions 13m.

As shown in FIG. 2, the rotor 22 includes a motor shaft 21, a rotor core, a rotor magnet, and a balance weight 24. The motor shaft 21 is supported by the first bearing 51 and the third bearing 55 to be rotatable around the first central axis J1. The first bearing 51 is fitted to an end portion of the motor shaft 21 on the one side in the axial direction. The third bearing 55 is fitted into a portion of the motor shaft 21 on the other side in the axial direction. The motor shaft 21 and the speed reduction mechanism 30 are connected to each other via the fourth bearing 56 to be rotatable around a second central axis J2 with respect to each other. The fourth bearing 56 is disposed between the first bearing 51 and the third bearing 55 in the axial direction and is fitted to the motor shaft 21. The first bearing 51, the third bearing 55, and the fourth bearing 56 are, for example, ball bearings. An end portion of the motor shaft 21 on the other side in the axial direction protrudes from the inside of the bearing holding portion 12e to the other side in the axial direction. An end portion of the motor shaft 21 on the other side in the axial direction protrudes to the other side in the axial direction with respect to the partition wall portion 12d.

The motor shaft 21 has a rotor core fixing shaft portion 21a, an eccentric shaft portion 21b, a weight mounting shaft portion 21c, and a large diameter portion 21d. The rotor core fixing shaft portion 21a extends in the axial direction around the first central axis J1. The rotor core is fixed to an outer peripheral surface of the rotor core fixing shaft portion 21a. The third bearing 55 is fitted to a portion of the rotor core fixing shaft portion 21a located on the other side in the axial direction with respect to the rotor core.

The eccentric shaft portion 21b is located on the one side in the axial direction with respect to the rotor core fixing shaft portion 21a. The eccentric shaft portion 21b is connected to an end portion of the motor shaft 21 on the one side in the axial direction from the other side in the axial direction. The eccentric shaft portion 21b is eccentric with respect to the first central axis J1. The eccentric shaft portion 21b extends around the second central axis J2 which is eccentric with respect to the first central axis J1. The second central axis J2 is parallel to the first central axis J1. Therefore, the eccentric shaft portion 21b extends in the axial direction. The eccentric shaft portion 21b is fitted into the fourth bearing 56. The eccentric shaft portion 21b supports an external gear 31 of the speed reduction mechanism 30, which will be described later, via the fourth bearing 56.

The weight mounting shaft portion 21c is disposed between the rotor core fixing shaft portion 21a and the eccentric shaft portion 21b in the axial direction. The weight mounting shaft portion 21c is connected to the eccentric shaft portion 21b from the other side in the axial direction. The weight mounting shaft portion 21c has a larger diameter than that of the eccentric shaft portion 21b. The weight mounting shaft portion 21c is disposed on the other side of the fourth bearing 56 in the axial direction and confronts an inner ring of the fourth bearing 56 in the axial direction.

The large diameter portion 21d is disposed on the one side of the weight mounting shaft portion 21c in the axial direction. The large diameter portion 21d is connected to the weight mounting shaft portion 21c from the other side in the axial direction. The large diameter portion 21d is disposed at one side of the rotor core fixing shaft portion 21a in the axial direction. The large diameter portion 21d is connected to the rotor core fixing shaft portion 21a from the one side in the axial direction. The large diameter portion 21d has a larger diameter than that of the weight mounting shaft portion 21c. In the example of the example embodiment, the large diameter portion 21d is the largest diameter portion in the motor shaft 21.

The rotor core has a tubular shape and is fixed to the outer peripheral surface of the rotor core fixing shaft portion 21a. The rotor magnet is fixed to an outer peripheral surface of the rotor core. As shown in FIGS. 2 and 3, the balance weight 24 is mounted on the weight mounting shaft portion 21c. The balance weight 24 has a center of gravity axis which is eccentric with respect to the first central axis J1. The center of gravity axis of the balance weight 24 is disposed at an interval of 180 degrees in the circumferential direction with respect to a center of gravity axis (the second central axis J2) of the eccentric shaft portion 21b. As shown in FIG. 2, the balance weight 24 is in contact with a surface of the large diameter portion 21d which faces the one side in the axial direction.

The stator 23 confronts the rotor 22 with a gap therebetween in the radial direction. The stator 23 includes an annular stator core which surrounds the outward side of the rotor 22 in the radial direction, and a plurality of coils which are mounted to the stator core. Although not shown, the stator core includes a back yoke and teeth. The back yoke has an annular shape which extends in the circumferential direction. A plurality of teeth extend inward from the back yoke in the radial direction and are disposed at intervals in the circumferential direction.

The control board 70 has a plate shape. A plate surface of the control board 70 faces in the axial direction and extends perpendicularly to the axial direction. The control board 70 is accommodated in the control board accommodation portion 12f. The control board 70 is disposed on the other side in the axial direction on the partition wall portion 12d. In the example of the example embodiment, the control board 70 is disposed away from the partition wall portion 12d to the other side in the axial direction. The control board 70 is electrically connected to the stator 23. The coil wire of the coil of the stator 23 is connected to the control board 70. For example, an inverter circuit is mounted on the control board 70.

The bus bar 80 is held by the connector portion 12c. The bus bar 80 is embedded in the connector portion 12c. A first end portion of the two end portions of the bus bar 80 is fixed to the control board 70. As shown in FIG. 1, a second end portion of the two end portions of the bus bar 80 is disposed in the opening portion of the connector portion 12c on the outward side in the radial direction and is exposed to the outside of the case 11. The bus bar 80 is electrically connected to an external power source connected to connector portion 12c. Electric power is supplied from the external power source to the coil of the stator 23 through the bus bar 80 and the control board 70.

The rotation detection portion 75 detects rotation of the rotor 22. As shown in FIG. 2, the rotation detection portion 75 is disposed in the control board accommodation portion 12f. The rotation detection portion 75 is disposed in a space between the partition wall portion 12d and the control board 70. The rotation detection portion 75 includes a mounting member 73, a second magnet 74, and a second rotation sensors 71.

The mounting member 73 is preferably made of, for example, a nonmagnetic material. However, the mounting member 73 may alternatively be made of a magnetic material if so desired. The mounting member 73 has an annular shape centered on the first central axis J1. An inner peripheral surface of the mounting member 73 is fixed to an end portion of the outer peripheral surface of the motor shaft 21 on the other side in the axial direction. The mounting member 73 is disposed on the other side of the third bearing 55 and the bearing holding portion 12e in the axial direction. A radially outer edge portion of the mounting member 73 is located on the one side in the axial direction with respect to a portion of the radially outer edge portion located on the inward side in the radial direction.

The second magnet 74 has an annular shape which extends in the circumferential direction. The second magnet 74 has an annular plate shape centered on the first central axis J1. A plate surface of the second magnet 74 faces in the axial direction and extends perpendicular to the axial direction. The second magnet 74 has an N pole and an S pole which are alternately disposed in the circumferential direction. The second magnet 74 is mounted on the mounting member 73. The second magnet 74 is fixed to a surface of the radially outer edge portion of the mounting member 73 which faces the other side in the axial direction. The second magnet 74 is fixed to the mounting member 73 by, for example, an adhesive. In the second magnet 74, the other side in the axial direction and the outward side in the radial direction are covered with a magnet cover. The mounting member 73 and the second magnet 74 rotate around the first central axis J1 together with the motor shaft 21.

The second rotation sensors 71 confront the second magnet 74 with a gap therebetween. The second rotation sensors 71 confront the second magnet 74 in the axial direction. The second rotation sensors 71 are located on the other side in the axial direction with respect to the second magnet 74. The second rotation sensors 71 detect a magnetic field generated by the second magnet 74. The second rotation sensors 71 are, for example, Hall elements. A plurality of second rotation sensors 71 are provided at regular intervals in the circumferential direction. For example, three second rotation sensors 71 may be provided at intervals of 120 degrees in the circumferential direction. The magnetic field generated by the second magnet 74 changes as the second magnet 74 rotates together with the motor shaft 21. The rotation of the motor shaft 21 can be detected by the second rotation sensor 71 detecting change in the magnetic field. For example, the second rotation sensor 71 may detect a rotational angle position of the motor shaft 21 in the circumferential direction with respect to the case 11. The second rotation sensor 71 may be termed, for example, a rotational angle position detection sensor or a rotational angle sensor. The second rotation sensor s 71 are mounted on a plate surface of the control board 70 which faces the one side in the axial direction. The second rotation sensors 71, the second magnet 74, the radially outer edge portion of the mounting member 73, and the bearing holding portion 12e are disposed at positions which overlap each other when seen in the axial direction.

The speed reduction mechanism 30 is connected to a portion of the motor shaft 21 on the one side in the axial direction. The speed reduction mechanism 30 is disposed on the outward side in the radial direction with respect to a portion of the motor shaft 21 on the one side in the axial direction. The speed reduction mechanism 30 is disposed at a position which overlaps the eccentric shaft portion 21b when seen in the radial direction. The speed reduction mechanism 30 is disposed between the bottom wall portion 13a and the stator 23 in the axial direction.

As shown in FIGS. 2 and 3, the speed reduction mechanism includes an external gear 31, an internal gear 33, and an annular plate portion 40c. The external gear 31 has a substantially annular plate shape centered on the second central axis J2. A plate surface of the external gear 31 faces in the axial direction and extends perpendicularly to the axial direction. A gear portion is provided on an outer peripheral surface of the external gear 31. The external gear 31 is connected to the eccentric shaft portion 21b via the fourth bearing 56. That is, the speed reduction mechanism 30 is connected to the motor shaft 21 via the fourth bearing 56. The fourth bearing 56 is fitted into the external gear 31. The fourth bearing 56 connects the motor shaft 21 to the external gear 31 such that they are rotatable around the second central axis J2 with respect to each other.

The external gear 31 has a plurality of pins 32. Each of the pins 32 has a columnar shape which protrudes from a surface of the external gear 31 which faces the one side in the axial direction to the one side in the axial direction. The plurality of pins 32 are disposed at regular intervals in the circumferential direction around the second central axis J2. In the example of the example embodiment, eight pins 32 are provided.

The internal gear 33 is fixed to the speed reduction mechanism case 13 to surround the outward side of the external gear 31 in the radial direction. The internal gear 33 has an annular shape centered on the first central axis J1. The internal gear 33 is disposed in a recessed portion 13n of the inner peripheral surface of the cover tubular portion 13b and is fixed to the cover tubular portion 13b. The recessed portion 13n is located at an end portion of the inner peripheral surface of the cover tubular portion 13b on the other side in the axial direction and opens to the other side in the axial direction and the inward side in the radial direction. Although not shown, an outer peripheral surface of the internal gear 33 has a polygonal shape when seen in the axial direction. The outer peripheral surface of the internal gear 33 has a plurality of flat portions arranged in the circumferential direction. A convex portion which comes into contact with the flat portion of the internal gear 33 from the outward side in the radial direction is provided on an inner peripheral surface of the recessed portion 13n. The rotation of the internal gear 33 with respect to the speed reduction mechanism case 13 is curbed by the contact between the flat portion of the internal gear 33 and the convex portion of the recessed portion 13n. A surface of the internal gear 33 which faces the one side in the axial direction is in contact with a surface of the recessed portion 13n which faces the other side in the axial direction. A surface of the internal gear 33 which faces the other side in the axial direction is in contact with the end surface of the peripheral wall portion 12a which faces the one side in the axial direction.

The internal gear 33 engages with the external gear 31. A gear portion is provided on an inner peripheral surface of the internal gear 33. The gear portion of the internal gear 33 engages with the gear portion of the external gear 31. The gear portion of the internal gear 33 engages with the gear portion of the external gear 31 in a portion thereof (a left side portion in each of FIGS. 2 and 3) in the circumferential direction. The number of teeth of the gear portion of the internal gear 33 and the number of teeth of the gear portion of the external gear 31 are different from each other. The number of teeth of the gear portion of the internal gear 33 is larger than the number of teeth of the gear portion of the external gear 31.

The annular plate portion 40c is a part of the output portion 40. The annular plate portion 40c is a connection portion which connects the speed reduction mechanism 30 to the output portion 40. As shown in FIG. 2, the annular plate portion 40c is disposed on the one side in the axial direction on the external gear 31. The annular plate portion 40c has an annular plate shape centered on the first central axis J1. A portion of the annular plate portion 40c on the outward side in the radial direction is located on the other side in the axial direction with respect to a portion thereof on the inward side in the radial direction. An outer portion of the annular plate portion 40c in the radial direction is thicker in the axial direction than the inner portion of the annular plate portion 40c in the radial direction. The annular plate portion 40c has a plurality of holes 40d which pass through the annular plate portion 40c in the axial direction. The holes 40d are disposed at the outer portion of the annular plate portion 40c in the radial direction.

As shown in FIG. 3, the plurality of holes 40d are disposed at regular intervals in the circumferential direction around the first central axis J1. In the example of the example embodiment, eight holes 40d are provided. The number of holes 40d is the same as the number of pins 32. Each of the holes 40d has a circular hole shape. An inner diameter of the hole 40d is larger than an outer diameter of the pin 32. The plurality of pins 32 are inserted into the plurality of holes 40d, respectively. An outer peripheral surface of each of the pins 32 is inscribed with an inner peripheral surface of each of the holes 40d. That is, the outer peripheral surface of each of the pins 32 and the inner peripheral surface of each of the holes 40d are in contact with each other on a part of the peripheral surfaces thereof. The inner peripheral surface of the hole 40d supports the external gear 31 through the pin 32 to be swingable.

The output portion 40 is a portion which outputs a driving force of the electric actuator 10. As shown in FIG. 2, the output portion 40 includes a tubular wall portion 40b, an annular plate portion 40c, and an output shaft portion 41. The tubular wall portion 40b has a tubular shape which extends in the axial direction around the first central axis J1.

The tubular wall portion 40b has a cylindrical shape which extends from a radially inner edge portion of the annular plate portion 40c to the one side in the axial direction. The tubular wall portion 40b has a cylindrical shape with a bottom which opens to the other side in the axial direction. The first bearing 51 is fitted to an end portion of an inner peripheral surface of the tubular wall portion 40b on the one side in the axial direction. Thus, the first bearing 51 connects the motor shaft 21 to the output portion 40 to be rotatable with respect to each other. The first bearing 51 connects the motor shaft 21 to the output portion 40 to be relatively rotatable around the first central axis J1 with respect to each other. An end portion of the motor shaft 21 on the one side in the axial direction is located inside the tubular wall portion 40b. An end surface of the motor shaft 21 which faces the one side in the axial direction confronts a surface of a bottom portion of the tubular wall portion 40b which faces the other side in the axial direction with a gap therebetween.

The tubular wall portion 40b is disposed in the support tubular portion 13d. The second bearing 54 is disposed between the tubular wall portion 40b and the support tubular portion 13d. The second bearing 54 is fitted to the support tubular portion 13d. That is, the second bearing 54 is fitted into the support tubular portion 13d. The tubular wall portion 40b is fitted into the second bearing 54. The second bearing 54 is sandwiched between an outer peripheral surface of the tubular wall portion 40b and an inner peripheral surface of the support tubular portion 13d. The second bearing 54 supports the output portion 40 to be rotatable with respect to the case 11.

The tubular wall portion 40b is sandwiched between the first bearing 51 and the second bearing 54 from the radial direction. The second bearing 54 and the tubular wall portion 40b are sandwiched between the support tubular portion 13d and the first bearing 51 in the radial direction. The first bearing 51, the tubular wall portion 40b, the second bearing 54, and the support tubular portion 13d are disposed at positions which overlap each other in radial direction. That is, the first bearing 51, the output portion 40, the second bearing 54, and the support tubular portion 13d are disposed at positions which overlap each other when seen in radial direction. According to the example embodiment, the first bearing 51, the output portion 40, and the second bearing 54 are sandwiched between the motor shaft 21 and the support tubular portion 13d in the radial direction. That is, the support tubular portion 13d supports the motor shaft 21 from the outward side in the radial direction via the first bearing 51, the output portion 40, and the second bearing 54. Thus, even when the motor shaft 21 is rotated at high speed, vibration of the output portion 40 in the radial direction due to an eccentric load can be curbed. In addition, generation of noise from the gear portion of the speed reduction mechanism 30 can be curbed. Abnormal friction of the output portion 40 and the speed reduction mechanism 30 is curbed. An output torque of the electric actuator is stabilized, and operation reliability of the electric actuator 10 is improved. Unlike the example embodiment, for example, when the first bearing 51 and the second bearing 54 are disposed at different positions when seen in the radial direction, the following problem may occur. That is, when the motor shaft 21 is rotated at high speed and an eccentric load is generated, the eccentric load acts on the output portion 40 via the first bearing 51, and the output portion 40 is vibrated in the radial direction with the second bearing 54 as a fulcrum, and noise may be generated from the gear portion of the speed reduction mechanism 30. Such a problem can be curbed by the example embodiment.

The second bearing 54 has a tubular shape which extends in the axial direction. The second bearing 54 is a sliding bearing. In the example embodiment, since the second bearing 54 is a sliding bearing, the first bearing 51 and the motor shaft 21 can be firmly supported from the outward side in the radial direction via the output portion 40. The second bearing 54 protrudes on the one side in the axial direction and on the other side in the axial direction for the first bearing 51. That is, the second bearing 54 protrudes to both sides in the axial direction with respect to the first bearing 51. The first bearing 51 is located inside the second bearing 54 when viewed in the radial direction. According to the example embodiment, since the first bearing 51 is supported from the outward side in the radial direction by the second bearing 54 over the entire length in the axial direction via the output portion 40, vibration and noise are further curbed.

The second bearing 54 has a bearing tubular portion 54a and a bearing flange portion 54b. The bearing tubular portion 54a has a cylindrical shape which extends in the axial direction around the first central axis J1. The bearing tubular portion 54a is sandwiched from the radial direction between the tubular wall portion 40b and the support tubular portion 13d.

The bearing flange portion 54b has an annular plate shape centered on the first central axis J1. The bearing flange portion 54b extends radially outward from an end portion of the bearing tubular portion 54a on the other side in the axial direction. A plate surface of the bearing flange portion 54b faces in the axial direction and extends perpendicularly to the axial direction. The bearing flange portion 54b is sandwiched between the end surface 13i of the support tubular portion 13d which faces the other side in the axial direction and the annular plate portion 40c from the axial direction. A surface of the bearing flange portion 54b which faces the one side in the axial direction is in contact with the end surface 13i of the support tubular portion 13d. A surface of the bearing flange portion 54b which faces the other side in the axial direction is in contact with a surface of the radially inner portion of the annular plate portion 40c which faces the one side in the axial direction. Movement of the second bearing 54 in the radial direction and the axial direction with respect to the case 11 is curbed. According to the example embodiment, the output portion 40 is supported by the support tubular portion 13d via the bearing tubular portion 54a and the bearing flange portion 54b of the second bearing 54 which is a sliding bearing. The posture of the output portion 40 is further stabilized while an accommodation space for the rotation detection device 60 which will be described later is secured on the outward side of the support tubular portion 13d in the radial direction.

The annular plate portion 40c extends radially outward from an end portion of the tubular wall portion 40b on the other side in the axial direction. The output shaft portion 41 extends in the axial direction and is disposed on the one side in the axial direction on the motor shaft 21. The output shaft portion 41 has a columnar shape centered on the first central axis J1. The output shaft portion 41 extends from the bottom portion of the tubular wall portion 40b to the one side in the axial direction. The output shaft portion 41 is inserted into the protruding tubular portion 13c. A portion of the output shaft portion 41 on the one side in the axial direction protrudes toward the one side in the axial direction with respect to the protruding tubular portion 13c. Another member through which the driving force of the electric actuator 10 is output is mounted on a portion of the output shaft portion 41 on the one side in the axial direction. In the example embodiment, the output portion 40 is a single member.

When the motor shaft 21 is rotated around the first central axis J1, the eccentric shaft portion 21b (the second central axis J2) revolves in the circumferential direction around the first central axis J1. The revolution of the eccentric shaft portion 21b is transmitted to the external gear 31 via the fourth bearing 56, and the external gear 31 revolves around the first central axis J1 in the internal gear 33. The external gear 31 swings while an inscribed position between the inner peripheral surface of the hole 40d and the outer peripheral surface of the pin 32 changes. At this time, a position at which the gear portion of the external gear 31 and the gear portion of the internal gear 33 engage with each other changes in the circumferential direction. The number of teeth of the external gear 31 and the number of teeth of the internal gear 33 are different from each other, and the internal gear 33 is fixed to the speed reduction mechanism case 13 and does not rotate. Accordingly, the external gear 31 rotates around the second central axis J2 with respect to the internal gear 33.

A direction in which the external gear 31 rotates is opposite to a direction in which the motor shaft 21 rotates. The rotation (the spinning) of the external gear 31 around the second central axis J2 is transmitted to the annular plate portion 40c through the hole 40d and the pin 32. Thus, the annular plate portion 40c rotates around the first central axis J1, and the output portion 40 rotates around the first central axis J1. In this way, the rotation of the motor shaft 21 is transmitted to the output shaft portion 41 via the speed reduction mechanism 30.

The rotation of the output portion 40 is decelerated by the speed reduction mechanism 30 with respect to the rotation of the motor shaft 21. Specifically, in the speed reduction mechanism of the example embodiment, a reduction gear ratio R of the rotation of the output portion 40 to the rotation of the motor shaft 21 is represented by $R=-(N2-N1)/N2$. A negative sign at the beginning of the right side of Equation representing the reduction gear ratio R indicates that a rotation direction of the output portion 40 to be decelerated is opposite to that of the motor shaft 21. N1 is the number of teeth of the external gear 31, and N2 is the number of teeth of the internal gear 33. As an example, when the number N1 of teeth of the external gear 31 is 59 and the number N2 of teeth of the internal gear 33 is 60, the reduction gear ratio R is $-1/60$. In this way, the speed reduction mechanism 30 of the example embodiment can increase the reduction gear ratio R of the rotation of the output portion 40 with respect to the rotation of the motor shaft 21. Accordingly, a rotational torque of the output portion 40 can be increased.

The rotation detection device 60 detects the rotation of the output portion 40. As shown in FIG. 2, the rotation detection device 60 includes a first magnet (a magnet) 63 and a first rotation sensor (a rotation sensor) 62. At least a part of the rotation detection device 60 is disposed at a position which faces the outward side of the support tubular portion 13d in the radial direction. That is, at least a part of the rotation detection device 60 confronts the support tubular portion 13d from the outward side in the radial direction. According to the example embodiment, the support tubular portion 13d is provided on the inner surface of the case 11, and the accommodation space for the rotation detection device 60 is disposed on the outward side of the support tubular portion 13d in the radial direction. That is, the rotation detection device 60 is disposed at a position which overlaps the support tubular portion 13d in the radial direction. Thus, an external shape of the electric actuator 10 in the axial direction can be kept small.

The first magnet 63 has an annular shape which extends in the circumferential direction. The first magnet 63 has a cylindrical shape centered on the first central axis J1. The first magnet 63 has N poles and S poles alternately disposed in the circumferential direction. The first magnet 63 is mounted on a surface of the annular plate portion 40c which faces the one side in the axial direction. The first magnet 63 is fixed to a portion of the annular plate portion 40c on the outward side in the radial direction. That is, the first magnet 63 is fixed to the output portion 40. The first magnet 63 rotates around the first central axis J1 together with the annular plate portion 40c.

The first magnet 63 is disposed at a position which overlaps the support tubular portion 13d when seen in the radial direction. The first magnet 63 is disposed at a position which confronts the outward side of support tubular portion 13d in the radial direction. The first magnet 63 surrounds the outward side of the support tubular portion 13d in the radial direction. A gap is provided between an inner peripheral surface of the first magnet 63 and the outer peripheral surface of the support tubular portion 13d. The first magnet 63 is located between the support tubular portion 13d and the cover tubular portion 13b in the radial direction. The first magnet 63 is disposed in a space on the outward side of the support tubular portion 13d in the radial direction. The first magnet 63 is disposed in a space between the annular plate portion 40c and the bottom wall portion 13a.

The first rotation sensor 62 confronts the first magnet 63 with a gap therebetween. The first rotation sensor 62 confronts the first magnet 63 in the axial direction. The first rotation sensor 62 is located on the one side in the axial direction for the first magnet 63. The first rotation sensor 62 detects a magnetic field generated by the first magnet 63. The first rotation sensor 62 is, for example, a Hall element. The magnetic field generated by the first magnet 63 changes as the first magnet 63 rotates with the output portion 40. The rotation of the output portion 40 can be detected by the first rotation sensor 62 by detecting the change in the magnetic field. The first rotation sensor 62 detects, for example, the rotational angle position of the output portion 40 in the circumferential direction with respect to the case 11. The first rotation sensor 62 may be termed, for example, a rotational angle position detection sensor or a rotational angle sensor.

The first rotation sensor 62 is disposed at a position which overlaps the support tubular portion 13d when seen in the radial direction. The first rotation sensor 62 is disposed at a position which confronts the outward side of the support tubular portion 13d in the radial direction. The first rotation sensor 62 is located on the other side in the axial direction for the bottom wall portion 13a. The first rotation sensor 62 is disposed between the bottom wall portion 13a and the first magnet 63. The first rotation sensor 62 is mounted on the mounting wall portion 13h. The first rotation sensor 62 is held by the mounting wall portion 13h. The first rotation sensor 62 is bridged and fixed between a set of mounting wall portions 13h which extend in parallel with each other. A gap is provided between the first rotation sensor and the bottom wall portion 13a. Since the mounting wall portion 13h is provided on a surface of the bottom wall portion 13a which faces the other side in the axial direction and is connected to the outer peripheral surface of the support tubular portion 13d, rigidity is ensured. Since the first rotation sensor 62 is mounted on the mounting wall portion 13*h*, detection of the first rotation sensor 62 is stabilized. Although not shown, three sensor terminals are provided at the first rotation sensor 62. The three sensor terminals are a sensor terminal for a power source, a sensor terminal for signal transmission, and a sensor terminal for grounding.

The first wiring member 91 and the second wiring member 92 electrically connect the control board 70 to the first rotation sensor 62. Each of the first wiring member 91 and the second wiring member 92 has three wires. The first wiring member 91 is held by the motor case 12. The first wiring member 91 passes through the first wiring holding portion 14. At least a part of the first wiring member 91 is embedded in the first wiring holding portion 14. The first wiring member 91 is electrically connected to the control board 70 and the second wiring member 92. The second wiring member 92 is held by the speed reduction mechanism case 13. The second wiring member 92 passes through the second wiring holding portion 15. At least a part of the second wiring member 92 is embedded in the second wiring holding portion 15. The second wiring member 92 is electrically connected to the first rotation sensor 62 and the first wiring member 91. The first wiring member 91 and the second wiring member 92 are electrically connected to each other by assembling the motor case 12 and the speed reduction mechanism case 13.

The present disclosure is not limited to the above-described example embodiment. For example, as described below, the configuration can be changed without departing from the spirit of the present disclosure.

In the above-described example embodiment, the example in which the first rotation sensor 62 is mounted on the mounting wall portion 13*h* has been described, but the present disclosure is not limited thereto. For example, the first rotation sensor 62 may be mounted on the bottom wall portion 13*a*. The first rotation sensor 62 only need to detect the rotation of the output portion 40 and may be a magnetoresistive element, for example. The second rotation sensor 71 only need to detect the rotation of the motor shaft 21 and may be a magnetoresistive element, for example.

Further, the rotation detection device 60 may have a circuit board (not shown). In this case, the circuit board is disposed in the speed reduction mechanism case 13. The first rotation sensor 62 is electrically connected to the circuit board, and the circuit board is electrically connected to the control board 70. A circuit board may be disposed at a position which confronts the outward side of the support tubular portion 13*d* in the radial direction. In the rotation detection device 60, at least some of the first magnet 63, the first rotation sensor 62, and the circuit board only need to be disposed at a position which confronts the outward side of the support tubular portion 13*d* in the radial direction.

In the above-described example embodiment, the example in which the second bearing 54 protrudes in the axial direction on the one side and the other side in the axial direction for the first bearing 51 has been described, but the present disclosure is not limited thereto. The second bearing 54 may protrude in the axial direction on the one side or the other side in the axial direction for the first bearing 51. The second bearing 54 may not protrude in the axial direction on the one side or the other side in the axial direction for the first bearing 51. However, as the second bearing 54 protrudes in the axial direction on the one side and the other side in the axial direction for the first bearing 51, vibration and noise of the output portion 40 and the speed reduction mechanism 30 are preferably curbed. Further, the second bearing 54 may not have the bearing flange portion 54*b*. Further, the second bearing 54 is not limited to a sliding bearing.

Further, it is enough that the speed reduction mechanism has a function of increasing a torque by decelerating the rotation of the motor shaft 21 and transmitting it to the output portion 40 and the speed reduction mechanism 30 is not limited to the configuration described in the above-described example embodiment.

In the above-described example embodiment, the output portion 40 is a single member but is not limited thereto. For example, the annular plate portion 40*c* and the tubular wall portion 40*b* of the output portion 40 and the output shaft portion 41 may be fixed by welding or the like.

In addition, in the range which does not deviate from the meaning of the present disclosure, the respective structures (components) described by the above-described example embodiment, modified example, remark and the like may be combined, and addition, omission, substitution, and other changes of the configuration are possible. Further, the present disclosure is not limited by the above-described example embodiment and is limited only by the scope of the claims.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:
1. An electric actuator comprising:
    a motor including a motor shaft extending along a central axis;
    a speed reducer disposed radially outward of a portion of the motor shaft on one side in an axial direction and connected to the motor shaft;
    an output portion including an output shaft portion to which rotation of the motor shaft is transmitted via the speed reducer;
    a rotation detector to detect rotation of the output portion;
    a case to accommodate the motor, the speed reducer, the output portion, and the rotation detector;
    a first bearing to connect the motor shaft to the output portion so as to be rotatable with respect to each other; and
    a second bearing to rotatably support the output portion with respect to the case; wherein
    the output shaft portion extends in the axial direction and is disposed on the one side in the axial direction for the motor shaft;
    a support tubular portion into which the second bearing is fitted is provided on a portion of the case located on the one side in the axial direction for the speed reducer;
    the first bearing, the output portion, the second bearing and the support tubular portion overlap each other when seen in a radial direction;
    at least a portion of the rotation detector confronts an outward side of the support tubular portion in the radial direction; and
    the second bearing protrudes in the axial direction on the one side the other side in the axial direction for the first bearing.
2. The electric actuator according to claim 1, wherein the rotation detector includes a magnet fixed to the output portion, and a rotation sensor to confront the magnet in the axial direction; and the rotation sensor is mounted on a mounting wall portion extending outward from an outer peripheral surface of the support tubular portion in the radial direction.

3. The electric actuator according to claim 2, wherein the second bearing is a sliding bearing.

4. The electric actuator according to claim 3, wherein the output portion includes a tubular wall portion sandwiched between the first bearing and the second bearing in the radial direction, and an annular plate portion extending radially outward from an end portion of the tubular wall portion on the other side in the axial direction;

the second bearing includes a bearing tubular portion sandwiched between the tubular wall portion and the support tubular portion in the radial direction, and a bearing flange portion extending radially outward from an end portion of the bearing tubular portion on the other side in the axial direction; and the bearing flange portion is sandwiched between an end surface of the support tubular portion facing the other side in the axial direction and the annular plate portion in the axial direction.

5. The electric actuator according to claim 1, wherein the rotation detector includes a magnet fixed to the output portion, and a rotation sensor to confront the magnet in the axial direction; and the rotation sensor is mounted on a mounting wall portion extending outward from an outer peripheral surface of the support tubular portion in the radial direction.

6. The electric actuator according to claim 5, wherein the second bearing is a sliding bearing.

7. The electric actuator according to claim 6, wherein the output portion includes a tubular wall portion sandwiched between the first bearing and the second bearing in the radial direction, and an annular plate portion extending radially outward from an end portion of the tubular wall portion on the other side in the axial direction;

the second bearing includes a bearing tubular portion sandwiched between the tubular wall portion and the support tubular portion in the radial direction, and a bearing flange portion extending radially outward from an end portion of the bearing tubular portion on the other side in the axial direction; and the bearing flange portion is sandwiched between an end surface of the support tubular portion facing the other side in the axial direction and the annular plate portion in the axial direction.

8. The electric actuator according to claim 1, wherein the second bearing is a sliding bearing.

9. The electric actuator according to claim 8, wherein the output portion includes a tubular wall portion sandwiched between the first bearing and the second bearing in the radial direction, and an annular plate portion extending radially outward from an end portion of the tubular wall portion on the other side in the axial direction;

the second bearing includes a bearing tubular portion sandwiched between the tubular wall portion and the support tubular portion in the radial direction, and a bearing flange portion extending radially outward from an end portion of the bearing tubular portion on the other side in the axial direction; and the bearing flange portion is sandwiched between an end surface of the support tubular portion facing the other side in the axial direction and the annular plate portion in the axial direction.

10. The electric actuator according to claim 1, wherein the second bearing is a sliding bearing.

11. The electric actuator according to claim 10, wherein the output portion includes a tubular wall portion sandwiched between the first bearing and the second bearing in the radial direction, and an annular plate portion extending radially outward from an end portion of the tubular wall portion on the other side in the axial direction;

the second bearing includes a bearing tubular portion sandwiched between the tubular wall portion and the support tubular portion in the radial direction, and a bearing flange portion extending radially outward from an end portion of the bearing tubular portion on the other side in the axial direction; and the bearing flange portion is sandwiched between an end surface of the support tubular portion facing the other side in the axial direction and the annular plate portion in the axial direction.

* * * * *